July 19, 1966 S. A. LOCK ETAL 3,261,575
AIRCRAFT
Filed May 22, 1964 2 Sheets-Sheet 1
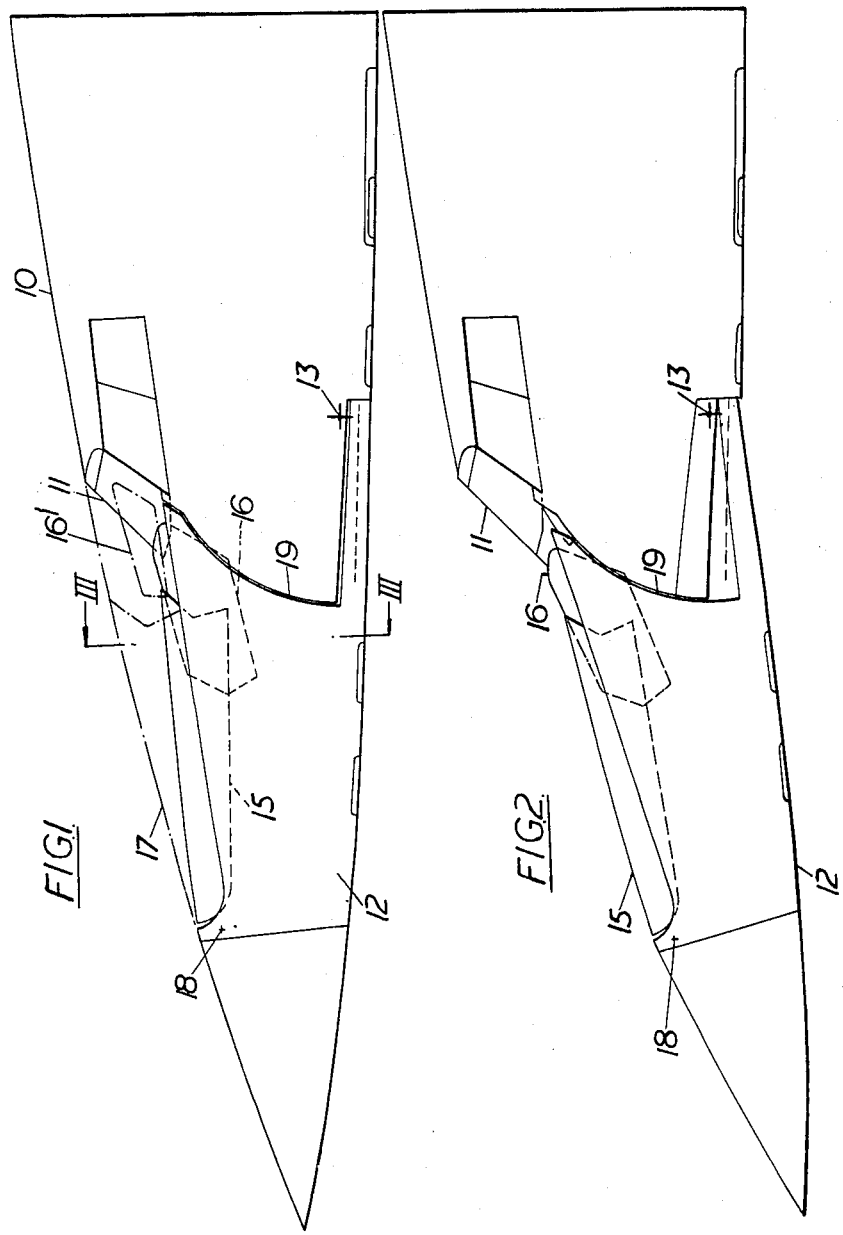
Inventor
STANLEY ANTHONY LOCK
JOHN FREEMAN LEACH
By Bailey, Stephen
& Kiutley
Attorneys

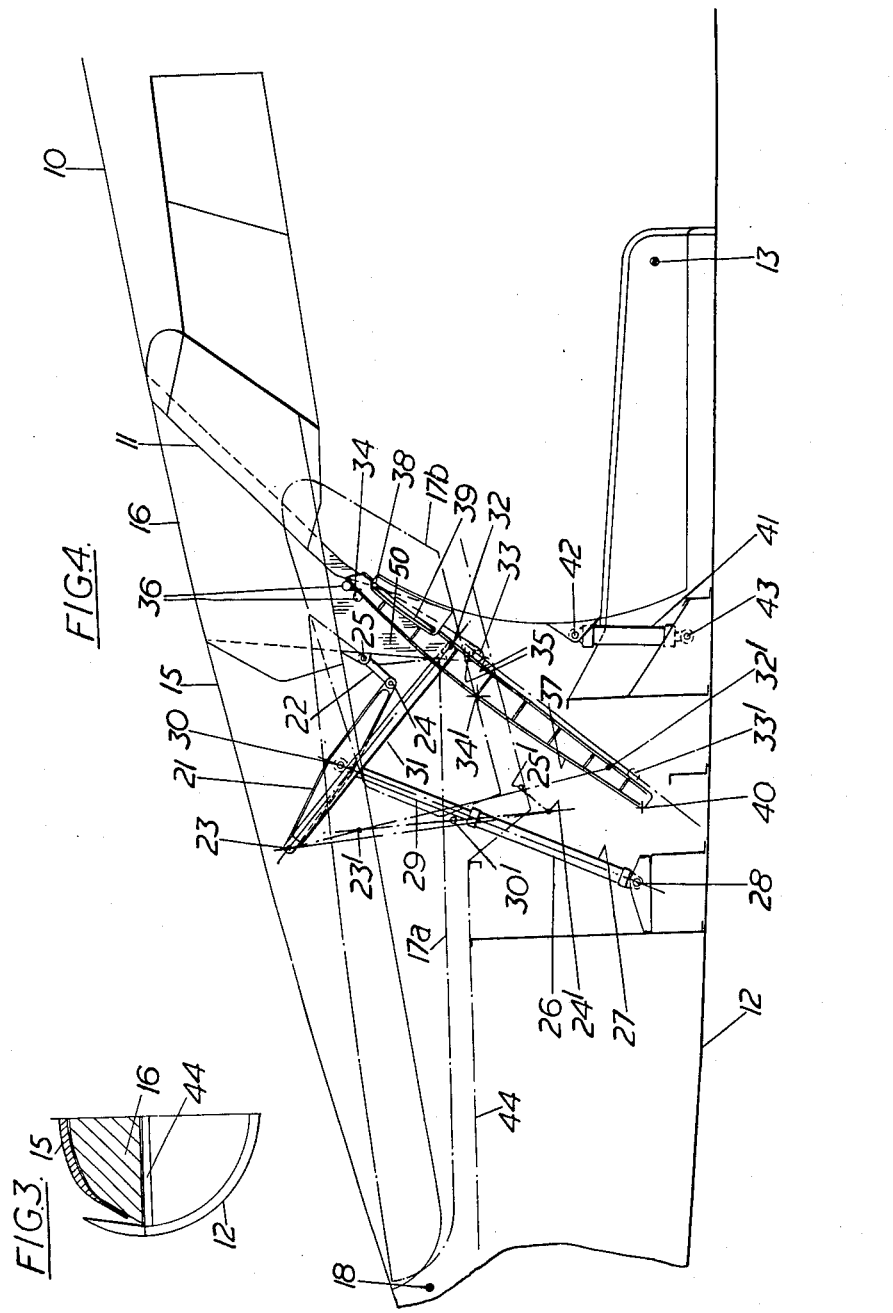

United States Patent Office 3,261,575
Patented July 19, 1966

3,261,575
AIRCRAFT
Stanley Anthony Lock, Kingswood, Bristol, and John Freeman Leach, Downend, Bristol, England, assignors to British Aircraft Corporation (Operating) Limited, London, England, a British company
Filed May 22, 1964, Ser. No. 369,439
Claims priority, application Great Britain, Oct. 23, 1963, 41,840/63
5 Claims. (Cl. 244—120)

Our patent No. 3,114,526 is concerned with an invention according to which a high-speed aircraft with a windscreen has a movable panel which can be moved between a first position in which it lies in front of the windscreen to provide the fuselage of the aircraft with the required streamlined shape for high-speed flight, and a second position, downwards from the first position, in which it lies inside the nose of the aircraft and at least partly exposes the windscreen. The present invention is an improvement in that general principle. For convenience the movable panel will here be termed a "shield."

According to the present invention the shield is in two parts, namely a rear part which is adjacent to the windscreen and is movable downwards and forwards to expose the windscreen, and a front part which is pivoted to the nose of the fuselage about a lateral axis at the front, so that it can be swung downwards into the nose.

An example of an aircraft according to the present invention is shown in the accompanying drawings. In these drawings:

FIGURES 1 and 2 are side views of the front of the aircraft; showing the aircraft set for different flight conditions;

FIGURE 3 is a cross-section on the line III—III in FIGURE 1;

FIGURE 4 is a side view showing the internal mechanism controlling the shield.

The aircraft shown in the drawings has a fuselage 10 which includes a windscreen (i.e. a forwardly facing window) 11 and a nose cone 12 which is pivoted to the main part of the fuselage about an axis 13.

The shield, which forms part of the nose cone of the aircraft, is in two parts, namely a front part 15 and a rear part 16. During supersonic flight, the two parts of the shield form a continuous and fully streamlined outline in front of the windscreen 11, as shown by the chain-dotted line 17 in FIGURE 1.

For the subsonic cruise configuration (i.e. with the windscreen shield retracted but with the nose up), the rear shield 16 is moved forwards and downwards partially within the front shield 15, and the front shield swings downwards about an axis 18 to the position indicated in heavy outline and broken lines on FIGURE 1.

FIGURE 3 is a sectional diagram of this configuration showing the rear shield 16 partially within the front shield 15, and also how both shields retract within the nose cone 12.

FIGURE 2 indicates the nose cone 12 lowered to the aircraft landing approach configuration to provide increased forward and downward vision. The nose cone 12 pivots about a point 13 and in consequence further lowers the two parts 15 and 16 of the shield to the position shown.

The rear shield 16 includes a window 16' on each side to provide limited forward vision in supersonic flight.

In FIGURE 4 the shield is shown in solid outline in the supersonic configuration, i.e. completely covering the windscreen 11. The subsonic cruise positions of the shield parts are indicated by chain-dotted lines 17a and b respectively, but for clarity the landing approach configuration is not illustrated.

The forward shield 15 is connected to the rear shield 16 by a beam 21 and a link 22. The beam 21 is pivotally attached to the forward shield 15 at 23 and pivotally attached to the link 22 at a point 24. The link 22 is pivotally attached at 25 to a lug mounted on the rear shield 16. The beam 21 is inclined upwards in the forward direction.

A jack 26, which may be fluid operated, has its casing 27 pivotally anchored to the nose cone 12 at a point 28 and has its ram 29 pivotally attached to the midpoint of the beam 21 at 30.

The pivot 23 serves also as a pivotal attachment for a rod 31 which is also pivoted at 32 to a member 50 projecting downwards from the rear shield 16. This downwardly projecting member 50 also carries two sets of rollers 35 and 36 mounted in carriers which are pivoted at 33 and 34, respectively. The rollers are constrained to run along tracks on opposite faces of a beam 37 which is attached at its upper end to the main part of the fuselage by means of a spigot 38 located in a guideway 39. The lower end of the beam is pivoted to the nose cone at 40.

The raising and lowering of the nose cone 12 is controlled by a jack 41 of which the casing is pivoted to the main part of the fuselage at 42, the ram of the jack being pivoted to the nose cone at 43.

As shown in FIGURE 3, the interior of the nose cone is partially sealed by means of a deck 44 situated immediately below the lowest position taken up by the shield when retracted.

During supersonic flight, the jack 26 is in its fully extended position as shown in FIGURE 4. When the jack is shortened, it initially causes the beam 21 to rotate about the axis 23 so as to move the rear shield 16 downwards and forwards along a path defined by the rollers 35 and 36 co-operating with the guide beam 37. At the same time, the front shield 15 is lowered through the action of the beam 21, the two shields being maintained in the appropriate spaced relationship by the rod 31. The rod 31 extends in approximately the same direction as the beam 21. During the lowering of the shields, the rear edge of the rear shield 16 moves on a curved path so as to clear any projections on the windscreen 11, for example windscreen wipers.

The positions of the various pivot points of the mechanism when the shields are retracted for subsonic cruising are shown by the reference numerals 23', 30', 24' etc.

For the landing approach configuration (or the take-off configuration) the nose cone 12 is lowered by extending the jack 41. The beam 37, being pivoted to the nose cone at 40, is pulled downwards so that its spigot 38 moves down the guideway 39. This causes the shields 15 and 16 to be further lowered, so that they take up the positions shown in FIGURE 2.

The joint line 19 between the nose cone and the main part of the fuselage is arranged to give a flush joint when the nose is in its normal flight position shown in FIGURE 4 (that is to say, the position suitable for supersonic and subsonic flight). The curved shape of the joint as seen from the side of the fuselage is designed to minimize the gap which is created when the nose cone is lowered.

Various other forms of mechanism may be used to control the two shields 15 and 16. For example, the mechanism may lower the rear shield 16 at first without moving the shield 15. An arrangement operating in that manner will now be described.

In this alternative arrangement the rod 31 is omitted. A vertical rod is pivoted to the beam 21, or directly to the front shield 15, and the lower end of the rod is pivoted to a vertical arm of a bellcrank. The rod holds the shield 15 in the upper position while the shield 16 is being lowered, and at the end of the downward movement of the shield 16, a part of the travelling assembly engages the bellcrank, disengages a hook on the bellcrank, and rotates the bellcrank so as to lower the rod and consequently to lower the shield 15.

The lowering of the shield 16 may be controlled by means of a jack such as the jack 26, or it may be controlled, for example, by means of an electric motor driving a pinion which meshes with a rack formed on the beam 37. In this case the motor, with a gear reduction unit, would be pivoted on the nose of the aircraft, and would drive the pinion via a splined shaft. In case of an emergency, a shaft may be connected to the motor and to a manual control in the cockpit.

We claim:

1. A high-speed aircraft having a windscreen, a nose, a shield, means for mounting the shield for movement between a first position in which the shield lies in front of the windscreen to provide the fuselage of the aircraft with the required streamlined shape for high-speed flight, and a second position, downwards from the first position, in which the shield lies inside the nose of the aircraft and at least partly exposes the windscreen, the shield being in two parts, namely a front part which is pivoted to the nose of the fuselage about a lateral axis at the front, so that it can be swung downwards into the nose, and a rear part which is adjacent to the windscreen, and including means for mounting the rear part for movement downwards and forwards to expose the windscreen.

2. An aircraft according to claim 1, in which the nose is pivoted to the remainder of the fuselage, so that it can be swung downwards to increase the downward vision through the windscreen.

3. An aircraft according to claim 1, including means for first moving the rear part of the shield downwards and forwards, and then swinging the front part downwards onto the rear part.

4. In an aircraft according to claim 3, a beam which is pivoted at opposite ends respectively to the front and rear parts of the shield for controlling the two parts of the shield, a jack, the beam being pivoted between its ends to the jack, so that the jack pulls the beam and consequently the shield part downwards, and a guide beam, the rear part of the shield being mounted on said guide beam so as to slide bodily downward thereon.

5. An aircraft according to claim 4, in which the beam pivoted to the front and rear parts of the shield is inclined upwards in the forward direction, the front end of the beam being pivoted to the front part of the shield, and the rear end of the beam being pivoted to the rear part of the shield, a rod which extends in approximately the same direction as the beam and is pivoted at its rear end to a member connected to the rear part of the shield, the front end of the beam being pivoted to the rod.

References Cited by the Examiner

UNITED STATES PATENTS 3,114,526  12/1963  Morgan _____ 244—121 X

FOREIGN PATENTS 987,494  4/1951  France.
358,223  4/1938  Italy.

OTHER REFERENCES

Aircraft Engineering, November 1963, page 329, #TL501 A 55.

MILTON BUCHLER, *Primary Examiner.*

ALFRED E. CORRIGAN, *Examiner.*